Feb. 25, 1936. L. E. SPEAR 2,031,912
MEASURING AND FILLING MECHANISM
Filed Oct. 10, 1934  2 Sheets-Sheet 2

Inventor
LAMBERT E. SPEAR
By Paul, Paul Moore
ATTORNEYS

Patented Feb. 25, 1936

2,031,912

UNITED STATES PATENT OFFICE 2,031,912

MEASURING AND FILLING MECHANISM

Lambert Edwin Spear, Minneapolis, Minn., assignor to Blue Moon Cheese Products, Inc., Minneapolis, Minn., a corporation of Delaware Original application December 8, 1930, Serial No. 500,823. Divided and this application October 10, 1934, Serial No. 747,756

9 Claims. (Cl. 221—103)

This invention relates to an improved mechanism for filling containers with measured quantities of material, and is a division of my pending application, Serial Number 500,823, filed December 8, 1930.

An object of the invention is to provide a measuring and filling mechanism capable of successively filling a plurality of containers with a suitable material, and whereby each container will receive substantially the same amount of material.

A further object is to provide a machine of the character described, comprising a hopper provided with a discharge opening, and having a cylindrical member mounted for relative movement therein, and a piston being movably supported in said cylindrical member and provided with means for preventing the formation of a vacuum in the feed tube or discharge opening, thereby to prevent air pockets from forming in the material before it is delivered into the container.

A further object is to provide a mechanism for delivering a predetermined quantity of material into each container, and having means whereby the quantity of material delivered into each container may be varied, if desired.

Other objects reside in the specific construction of the measuring mechanism, whereby a measured quantity of the material is delivered into each container substantially without variation; in the means provided for preventing the formation of a vacuum in the feed tube and whereby air pockets cannot form in the material delivered into the containers; and, in the provision of a measuring mechanism which may readily be adjusted to vary the amount of material delivered into the containers, whereby the mechanism may be adjusted to adapt it for packaging different kinds of materials, which may be put up in different sized containers, and the mechanism be so constructed that each container may be filled with exactly the same amount of material.

A further object is to provide a measuring and filling mechanism, particularly well suited for filling small containers or cartons with cheese, while in substantially a semi-fluid state, although it is to be understood that it may be used for packaging various other materials.

Other objects of the invention will appear from the following description and accompanying drawings and will be pointed out in the annexed claims.

In the accompanying drawings there has been disclosed a structure designed to carry out the various objects of the invention, but it is to be understood that the invention is not confined to the exact features shown as various changes may be made within the scope of the claims which follow.

Figure 1:
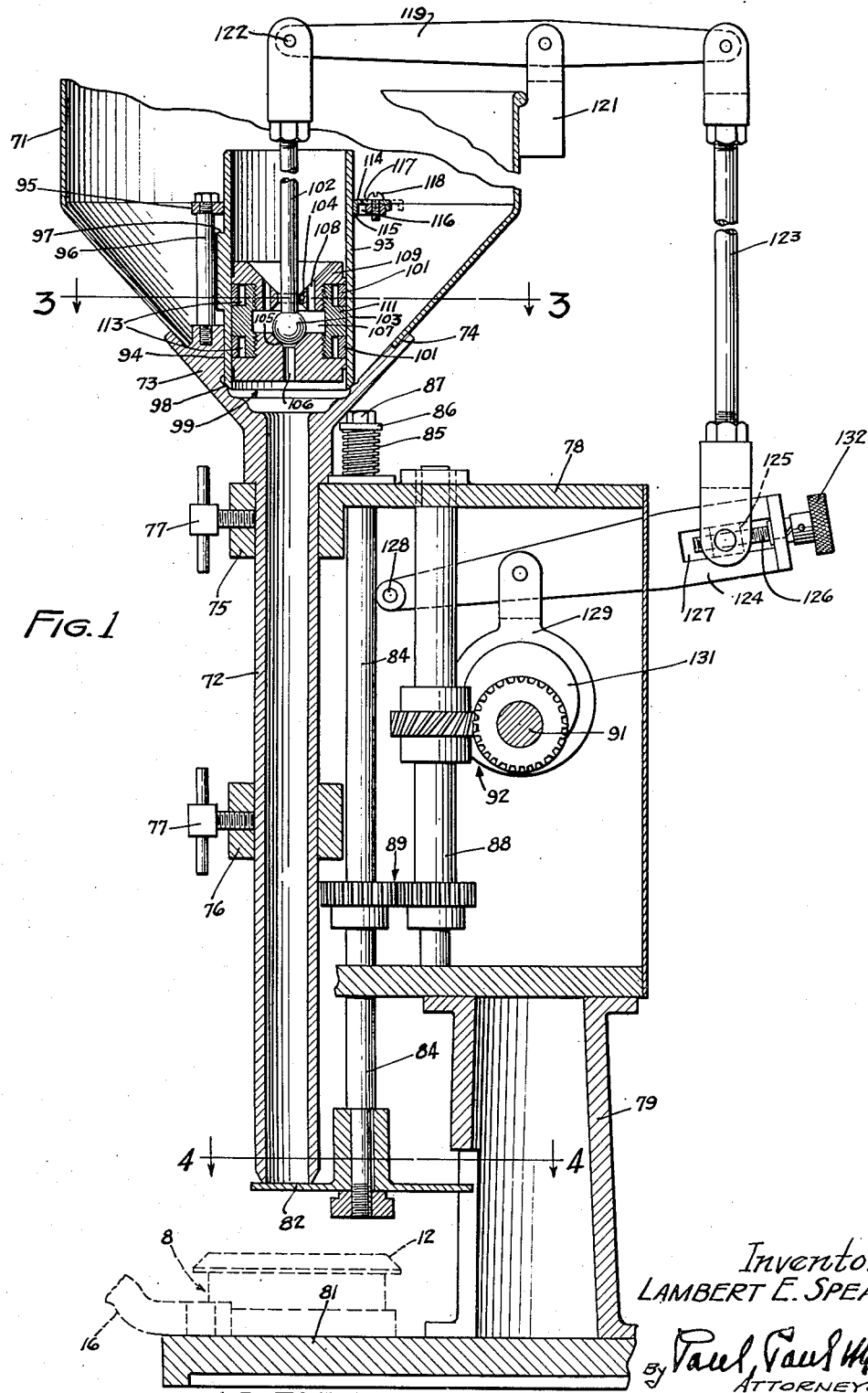
Figure 1 is a vertical sectional view of the mechanism, showing the piston at the bottom of its stroke.

The novel measuring and filling mechanism, herein disclosed, is shown comprising a hopper 71 supported upon a filler tube 72 having an outwardly flared head 73 provided with a seat 74, in which the lower end of the hopper 71 is mounted and suitably secured. The filler tube 72 is shown supported in split brackets 75 and 76, each provided with a thumb screw 77, whereby the tube 72 may be secured in position in said brackets. The brackets may be supported upon a housing 78 suitably secured to a post 79 mounted upon a base plate 81 which, in turn, may be carried by a suitable support, not shown in the drawings.

Figure 4:
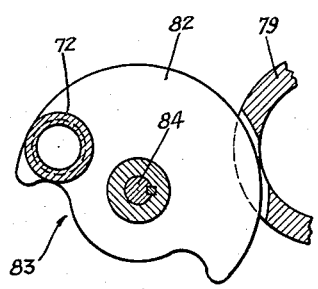
Figure 4 is a detail sectional view on the line 4—4 of Figure 1, showing the means provided at the bottom of the filling tube for retaining the material therein, when a filled container is removed from therebeneath and an empty container substituted therefor.

Means is provided at the discharge end of the filler tube for preventing the material from discharging therefrom, when removing a filled container from therebeneath and inserting an empty container in position to receive a charge. Such means is shown comprising a rotary disk valve 82, supported upon the lower end of a shaft 84, mounted in suitable bearings provided in the housing 78. The valve 82 has a portion cut away, as indicated at 83 in Figure 4, which cutaway portion is in registration with the opening in the filler tube, when a charge is being delivered into a container. When the valve 82 is in the position shown in Figures 1 and 4, the lower end of the filler tube will be closed to the flow of material therefrom.

The upper end of the shaft 84 is shown extending above the top wall of the housing 78 and has a suitable compression spring 85 coiled thereabout, one end of which engages the housing 78 and the opposite end, a washer 86, secured to the end of the shaft 84 by a suitable bolt or nut 87.

This spring constantly exerts an upward pressure on the shaft 84, to thereby hold the disk valve 82 in contact with the lower end of the filler tube 72. The shaft 84 may be driven from an upright shaft 88 by suitable gears 89. The upright shaft 88 is shown driven from a drive shaft 91 by suitable spiral gears 92. The drive shaft 91 is mounted in suitable bearings, not shown, and may be driven from a suitable source of power, such as an electric motor, not shown in the drawings.

Figure 2:
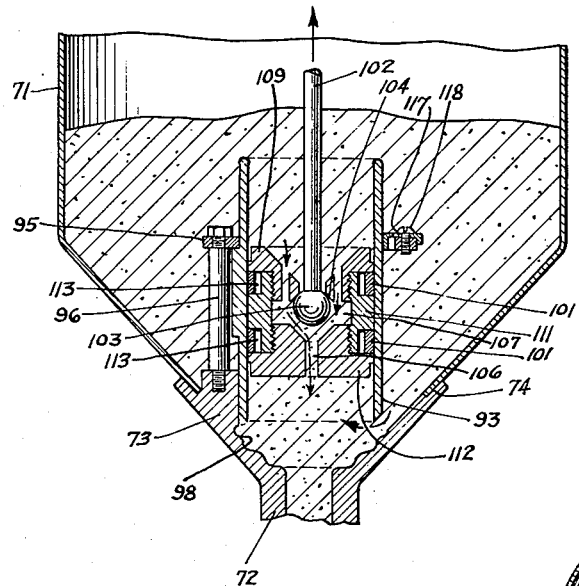
Figure 2 is a detail sectional view, showing the piston at the upper end of its stroke.
Figure 3:
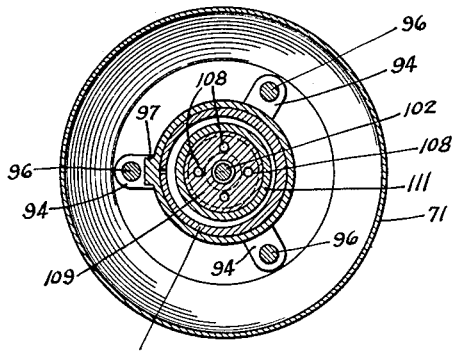
Figure 3 is a cross-sectional view on the line 3—3 of Figure 1.

The means for feeding the material downwardly through the feed tube 72 and measuring each charge delivered into the containers, is shown in detail in Figures 1 and 2, and consists of a vertically disposed cylinder 93, which is open at each end and mounted for limited vertical movement within the hopper 71. The lower portion of the cylinder 93 is supported in suitable guides 94, shown integrally formed with the head 73 of the filling tube. The upper end of the cylinder is supported in a guide ring 95 mounted upon studs 96, shown secured to the cylinder guides 94. A projection 97 is shown provided upon the periphery of the cylinder 93, the upper end of which is adapted to engage the guide ring 95 to thereby limit the upward movement of the cylinder. The lower outer corner of the wall of the cylinder 93 is preferably beveled off, as shown in Figures 1 and 2, to provide a conical face adapted to engage a narrow seat 98 provided in the head 73. In Figure 1, the cylinder 93 is shown in its normal position in engagement with the seat 98.

The means for actuating the cylinder 93 and feeding the material downwardly through the filler tube 72 is shown consisting of a piston 99 mounted for reciprocal movement within the cylinder 93, and provided with suitable piston rings 101 adapted to seal the joint between the periphery of the piston and the bore of the cylinder 93. The piston 99 is actuated by a piston rod 102, shown provided at its lower end with a suitable head 103, preferably spherical in shape, and situated within a chamber 107 in the piston. The head 103 is adapted to engage a valve seat 105 in the lower portion of the piston for the purpose of closing a port 106, adapted to establish communication between the chamber 107 and the interior of the filler tube 102. When the connecting rod 102 descends in the cylinder 93, the head 103 thereof will engage the valve seat 105 and close the port 106 in the piston, after which the piston is moved downwardly by the connecting rod 102. A plurality of small ports 108 connect the piston chamber 107 with the upper portion of the cylinder 93. In the drawings, I have shown the piston comprising three parts, exclusive of the rings 101, namely, an upper section 109, an intermediate section 111, and a lower section 112, connected together by suitable threads, as clearly illustrated in Figures 1 and 2. The intermediate section is provided with annular recesses 113 adapted to receive the piston rings 101.

Means are provided whereby the cylinder 93 may readily be removed from its guides for cleaning, when necessary. Such means is best shown in Figures 1 and 2, and comprises a small clip 114 having its inner end portion 115 bent downwardly and received in a notch 116 provided in the guide ring 95. The clip 114 has a slot 117 therein adapted to receive a screw 118 by means of which it may be secured to the guide ring 95. To remove the cylinder 93 from its guides, the screw 118 is loosened, whereby the clip 114 may be moved to the dotted line position, indicated in Figure 1, whereby the projection on the periphery 93 may pass upwardly through the notch 116 in the guide ring 95, and thus permit the cylinder to be removed from the hopper. Before removing the cylinder 93 from its guides, however, the piston rod 102 is disconnected from a rocker arm 119, shown supported upon the upper portion of the hopper by means of a bracket 121. By removing the pin 122, which connects the upper end of the piston rod 102 to the rocker arm 119, the piston and cylinder may be removed, as a unit, from the hopper.

Means is provided for operating the rocker arm 119 and may consist of a connecting rod 123 having its upper end connected to one end of the rocker arm 119 and its lower end adjustably connected to an operating arm 124 by means of a slidably mounted block 125 and an adjusting screw 126. The block 125 is shown movably supported in a slot 127 provided in the arm 124. The opposite end of the arm 124 is pivotally connected to the housing 78 by means of a pin 128. A short pitman 129 has one end pivotally connected to the arm 124 and its opposite end to an eccentric 131 secured to the drive shaft 91.

In the operation of the novel measuring and filling mechanism herein disclosed, the material to be packaged, which preferably is in a semi-liquid state, is delivered into the hopper 71 from a suitable source, whereby the measuring mechanism, comprising the cylinder 93 and piston 99 may be submerged in the material, as illustrated in Figure 2. When the apparatus is at rest, the piston 99 and cylinder 93 are in the positions shown in Figure 1, whereby the material is retained in the hopper because of the cylinder 93 being engaged with the seat 98. When a container is positioned beneath the lower end of the filler tube, as indicated in dotted lines in Figure 1, the operator will cause the drive shaft 91 to rotate, whereby the rocker arm 119 is actuated to lift the piston upwardly to a position within the upper end of the cylinder 93. The initial upward movement of the piston will cause the cylinder to move upwardly, and out of engagement with the seat 98, as shown in Figure 2.

When the connecting rod 102 is initially operated from the position shown in Figure 1, the spherical valve element 103 at the lower end thereof moves out of engagement with the seat 105 and into engagement with the seat 104 without imparting any upward movement to the piston 99. As soon as the valve element 103 engages the seat 104, the piston will move upwardly simultaneously with the connecting rod, and because of the piston rings 113 thereof frictionally engaging the walls of the bore of the cylinder 93, the latter will also move upwardly until the shoulder 97 of the cylinder engages the guide ring 95, as shown in Figure 2, whereupon the cylinder will come to rest. The piston, however, will continue upwardly until the connecting rod has completed its full upward stroke.

Such upward movement of the piston within the cylinder will cause a portion of the material in the hopper to be drawn into the cylinder beneath the lower edge thereof, because of the lower end of the cylinder being spaced from the seat 98, as clearly illustrated in Figure 2. At the same time, a small quantity of material will pass downwardly through the ducts 108 at the upper portion of the piston, and into the piston chamber 107, from which it passes through the duct 106 in the lower portion of the piston, into the lower end of the cylinder, as will readily be understood by reference to Figure 2, wherein the arrows indicate the flow of the material into the lower end of the cylinder, when the piston moves upwardly.

Upon the initial downward movement of the piston, the valve head 103 moves out of engagement with the valve seat 104 and into engagement with the seat 105 whereby the port 106 is closed to the passage of material therethrough. The piston then moves downwardly with the operating rod 102, and carries with it, the cylinder 93, until the latter engages the seat 95 and comes to rest. The material drawn into the lower end of the cylinder by the suction of the piston, during its upward movement, is then forced downwardly into the filler tube in a measured quantity. It is also to be understood, that during the downward movement of the piston, as above described, the disk valve 82 at the bottom of the filler tube will be actuted so that when the piston commences its downward movement, the cutaway portion 82 of the disk valve 83 will register with the discharge end of the filler tube to thereby prevent the material to discharge therefrom.

The ducts 108 connecting the upper portion of the cylinder 93 with the piston chamber 107 cooperate with the duct 106 and valve head 103 to prevent the formation of a vacuum in the lower portion of the cylinder and upper end of the filler tube during the upward movement of the piston. The formation of a vacuum is avoided because of the valve head 103 at the lower end of the piston rod 102 moving out of engagement with its seat 105, when the piston commences its upward movement, whereby some of the material in the upper portion of the cylinder 93 will flow downwardly through the ducts 108, chamber 107, and through the duct 106 into the lower portion of the cylinder, thereby positively preventing the formation of a vacuum in the filler tube, with the result that the material in said tube will be free from air bubbles and air pockets. By thus permitting a portion of the material to flow downwardly through the piston during the up stroke thereof, less energy is required to lift the piston and cylinder.

The quantity of material discharged from the filler tube 72 for each cycle of operation may be varied by manipulation of the adjusting screw 126, which, it will be noted by reference to Figure 1, has a knurled head 132 whereby it may be conveniently rotated. Adjustment of this screw will cause the block 125 to be relatively moved in the slot 127, whereby the stroke of the piston may be accurately adjusted to cause a predetermined measured quantity of material to be discharged from the hopper 71 for each stroke thereof.

The structure is very simple and inexpensive in construction and has been found very efficient in operation, in that it will accurately fill each container with substantially the same amount of material and substantially without variation. By means of the ducts 106 and 108 in the piston and valve 103, air is positively prevented from entering the lower end of the cylinder and the filler tube, whereby the material in the filler tube will be in the form of a solid compact mass, free from air pockets and air bubbles.

While the machine has been found particularly useful and efficient in the packaging of cheese in small containers or cartons, it is obvious that it may be used for various other purposes where applicable, and where accurateness in filling the cartons or containers is an important factor. In some instances, it may be desirable to eliminate the long dispensing or filler tube 72, shown in Figure 1, and simply provide the hopper with a discharge opening from which the material may be delivered directly into the container or receptacle. The driving means for the piston may also be varied in numerous ways without departing from the scope of the invention.

I claim as my invention:

1. In an apparatus for delivering measured quantities of material into containers, a hopper having a discharge opening, a cylinder mounted for limited vertical movement in said hopper and open to receive material at both ends, a seat in the bottom of the hopper normally engaged by said cylinder, a piston movably mounted in said cylinder and adapted, upon its up stroke, to first unseat the cylinder, after which the piston will relatively move therein and draw a portion of the material in the hopper into said cylinder below the piston, means whereby when the piston is moved downwardly, the cylinder is moved into engagement with said seat and the material in the lower portion thereof discharged therefrom through said discharge opening in a measured quantity, and means for preventing the formation of a vacuum in the cylinder.

2. In an apparatus for delivering measured quantities of material into containers, a hopper having a discharge opening, a seat in the hopper, a cylinder normally having one end engaging said seat, a piston in the cylinder, an operating member connected to said piston and adapted to operate the latter and said cylinder, a stop for limiting movement of the cylinder, movement of the piston in one direction unseating the cylinder and causing a portion of the material in the hopper to be drawn into the lower end thereof, and movement of the piston in the opposite direction, causing the material in the cylinder below the piston to be ejected therefrom through said discharge opening, in a measured quantity, and valve means for preventing the formation of a vacuum below the cylinder during its up stroke.

3. In an apparatus for delivering measured quantities of material into containers, a hopper having a discharge opening, a seat in the hopper, a cylinder normally having one end engaging said seat, a piston in the cylinder, an operating member connected to said piston and adapted to operate the latter and said cylinder, movement of the piston in one direction, unseating the cylinder and causing a portion of the material in the hopper to be drawn into the lower end thereof, and movement of the piston in the opposite direction, causing the material in the cylinder below the piston to be ejected therefrom through said discharge opening in a measured quantity, and valve means in the piston for preventing the formation of a vacuum in the lower portion of the cylinder.

4. In an apparatus for delivering measured quantities of material into containers, a hopper having a discharge opening at its lower end surrounded by an annular seat, a cylinder mounted for vertical movement in said hopper and having one end normally engaging said seat, a piston mounted for reciprocal movement in the cylinder and frictionally engaging the same, whereby when the piston is moved upwardly, the cylinder is unseated from said annular seat to thereby permit the piston to draw a portion of the material in the hopper into the lower end of the cylinder, and the connection between the periphery of the piston and the bore of the cylinder being such that upon initial downward movement of the piston, the cylinder will move into sealing engagement with said seat, whereby the material in the cylinder below the piston may be forced through the discharge opening of the hopper in a measured quantity, and means whereby a portion of the material in the cylinder above the piston may pass through the piston and into the lower portion of the cylinder, during the up stroke of the piston.

5. In an apparatus for delivering measured quantities of material into containers, a hopper having a discharge opening at its bottom surrounded by an annular seat, a cylinder mounted in the hopper and adapted for relative vertical movement therein, the lower end of said cylinder normally engaging said seat, a piston in the cylinder, valve means in said piston for establishing circulation therethrough, and a connecting rod for operating said piston, said connecting rod having a limited movement with respect to the piston to thereby operate said valve means, and whereby when the piston is moved upwardly, a portion of the material in the hopper may pass through the valve means on the piston and into the lower portion of the cylinder, and when said piston is moved downwardly, said valve means is actuated to interrupt liquid flow through the piston, whereby all of the material drawn into the lower end of the cylinder may be discharged therefrom through said discharge opening in a measured quantity.

6. In an apparatus for delivering measured quantities of material into containers, a hopper having a discharge opening at its bottom, an annular seat in the hopper, a cylinder normally engaged with said seat and adapted for limited vertical movement within the hopper, a piston mounted for vertical movement within the cylinder, valve means in the piston, an operating member connected to said piston for imparting reciprocal movement thereto, and adapted upon movement in one direction, to open said valve means and thereby permit a portion of the material above the piston to flow therethrough and into the lower end of the cylinder, and when said operating member is moved in the opposite direction, said valve means is closed before the piston commences its downward movement, whereby the material in the lower portion of the cylinder is discharged from the hopper in a measured quantity, through the discharge opening thereof.

7. In an apparatus for delivering measured quantities of material into containers, a hopper having a feed tube through which the material is conveyed from the hopper to the containers, a cylindrical member movably mounted within the hopper directly over the feed tube and normally having its lower end engaged with a seat, a piston mounted for relative movement within said cylindrical member and having a passage therethrough, a rod for actuating the piston, movement of the piston in one direction, causing the cylindrical member to be moved out of engagement with its seat, whereby material may be drawn into the lower end of said member from the hopper, and movement of the piston in the opposite direction causing the cylindrical member to engage its seat, whereby the material drawn into the lower end thereof will be forced into the feed tube by continued downward movement of the piston, and means operated by the piston rod for controlling circulation through the passage in the piston.

8. In an apparatus for delivering measured quantities of material into containers, a hopper having a feed tube adapted to deliver the material into the containers from the hopper, a cylinder movably mounted in the hopper and communicating with the feed tube and normally having its lower end engaged with a seat provided in the hopper, a piston mounted for relative movement within the cylinder, movement of said piston in one direction causing the cylinder to be moved out of engagement with its seat, whereby material is drawn into the lower end thereof, and movement of the piston in the opposite direction causing said cylinder to engage its seat, whereby the material drawn into the cylinder will be forced into the feed tube, and means for preventing the formation of a vacuum within the cylinder and feed tube, during the suction stroke of the piston.

9. In an apparatus for delivering measured quantities of material into containers, a hopper having a feed tube adapted to deliver the material into the containers, a cylinder movably mounted within the hopper, open at each end, and communicating at its lower end with the feed tube and normally having its lower edge engaged with a seat in the hopper, a piston mounted for relative movement within the cylinder, an operating member for the piston, and a valved duct in said piston controlled by relative movement of said operating member, and whereby a portion of the material above the piston may flow therethrough into the lower portion of the cylinder, when the piston is moved upwardly, such upward movement of the piston also effecting unseating of the cylinder, whereby material is drawn into the lower end thereof from said hopper, and movement of said operating member in the opposite direction causing said valved duct to close before the piston is actuated, after which the connection between the piston and cylinder will cause the latter to move into engagement with its seat, whereby continued movement of the piston will force the material drawn into the lower portion of the cylinder into the feed tube in a measured quantity.

LAMBERT EDWIN SPEAR.